United States Patent
Fujimaru et al.

Patent Number: 5,256,639
Date of Patent: Oct. 26, 1993

[54] DIELECTRIC CERAMIC COMPOSITION

[75] Inventors: Takuya Fujimaru; Takehiko Yoneda; Hiromi Tokunaga; Hiromitsu Taki, all of Miyazaki, Japan

[73] Assignee: Matsushita Electric Industrial Co., Ltd., Osaka, Japan

[21] Appl. No.: 947,814

[22] Filed: Sep. 21, 1992

Related U.S. Application Data

[63] Continuation-in-part of Ser. No. 820,815, Jan. 15, 1992, abandoned.

[30] Foreign Application Priority Data

Jan. 21, 1991 [JP] Japan ................... 3-4976

[51] Int. Cl.$^5$ ............... C04B 35/46; C04B 35/49
[52] U.S. Cl. ................. 501/137; 501/134; 501/135; 501/138; 501/139
[58] Field of Search ............ 501/134, 135, 136, 137, 501/138, 139; 252/518, 520, 521

[56] References Cited

U.S. PATENT DOCUMENTS

| | | | |
|---|---|---|---|
| 4,330,631 | 5/1982 | Kawashima et al. | 501/139 |
| 4,699,891 | 10/1987 | Sato et al. | 501/139 |
| 4,753,906 | 6/1988 | Nishigaki et al. | 501/139 |
| 4,866,017 | 9/1989 | Okawa | 501/139 |
| 5,077,247 | 12/1991 | Sato et al. | 501/137 |

FOREIGN PATENT DOCUMENTS 59-51091 12/1984 Japan.
60-41633 9/1985 Japan.

OTHER PUBLICATIONS

"A New BaO-TiO$_2$ compound with Temperature-Stable High Permittivity and Low Microwave Loss", H. M. O'Bryan, Jr. et al, Journal of The American Ceramic Society, vol. 57, No. 10, (1978), pp. 450-453.

*Primary Examiner*—Mark L. Bell
*Assistant Examiner*—Michael A. Marcheschi
*Attorney, Agent, or Firm*—Lowe, Price, LeBlanc & Becker

[57] ABSTRACT

A dielectric ceramic composition represented by the compositional formula: $_x$BaO-$_y$TiO$_2$-$_z$Nd$_2$O$_3$-$_t$Sm$_2$O$_3$-$_w$Bi$_2$O$_3$ so composed as to be in the molar fractions of $0.06 \leq x \leq 0.25$, $0.60 \leq y \leq 0.80$, $0.05 \leq z \leq 0.18$, $0 < t \leq 0.07$ and $0 < w \leq 0.05$, provided that $x+y+z+t+w=1$, and a compositional range of $Y < 0.68$ and $Z > 0.15$ is excluded. As an additive, at least one of Al$_2$O$_3$, ZrO$_2$, etc. may be added. Part of Ba may be replaced with at least one of Sr, Ca and Mg. The Sm$_2$O$_3$ and Nd$_2$O$_3$ each may have a purity of at least 70 wt. %.

12 Claims, 9 Drawing Sheets

DIELECTRIC CERAMIC COMPOSITION

This application is a continuation-in-part of U.S. Ser. No. 07/820,815, filed Jan. 15, 1992, now abandoned.

BACKGROUND OF THE INVENTION

1. Field of the Invention

This invention relates to a dielectric ceramic composition utilizable as a material for dielectric substrates used in dielectric resonators and electronic equipment.

2. Description of the Prior Art

In high-frequency regions, dielectrics have been hitherto applied, e.g., to impedance matching of microwave circuits and to dielectric resonators. In particular, with recent progress in techniques for the integration of microwave circuits, energetic efforts are being directed to making devices compact by using a dielectric resonator making use of high-permittivity and low-loss dielectric ceramics for the purpose of, e.g., stabilizing frequencies of bandpass filters or oscillators, and it is sought to provide a dielectric ceramic composition having a high permitivity (or dielectric constant) and a high unloaded Q, having a low temperature coefficient of resonant frequency ($\tau f$) and also capable of varying the respective characteristics over a wide range.

Now, as materials for these dielectrics, $BaO\text{-}TiO_2$ dielectric ceramics [H. M. O, Bryan, Jr., Thomson, Jr. and J. K. Plourde: J. Am. Ceram. Soc. 57 (1974) 450] and those part of which has been replaced with other element, and also those in which $TiO_2$ with a negative value and a dielectric ceramic or glass with a positive value are used in combination so that the temperature coefficient of resonant frequency ($\tau f$) can be controlled have been utilized.

The above conventional materials, however, have so low a dielectric constant and unloaded Q or so high a temperature coefficient of resonant frequency ($\tau f$) that they have a difficulty in their practical use, bringing about various problems. In order to solve such problems, a $BaO\text{-}TiO_2\text{-}Nd_2O_3$ dielectric ceramic composition (Japanese Patent Publication No. 60-41633) and a $BaO\text{-}TiO_2\text{-}Nd_2O_3\text{-}Bi_2O_3$ dielectric ceramic composition (Japanese Patent Publication No. 59-51091) have been proposed. The former, however, has so high a temperature coefficient of resonant frequency ($\tau f$) and the latter has so low an unloaded Q with respect to specific dielectric constant that they have been still unsatisfactory for responding the demands for making the required characteristics greater in variety.

SUMMARY OF THE INVENTION

The present invention intends to solve the above problems involved in the prior art. Accordingly, an object of the present invention is to provide a dielectric ceramic composition having a high dielectric constant and unloaded Q and a low temperature coefficient of resonant frequency ($\tau f$), and also capable of varying the dielectric constant, unloaded Q and temperature coefficient of resonant frequency ($\tau f$) over a wide range so that it can respond the demands for making the required characteristics greater in variety.

According to an embodiment of the present invention the dielectric ceramic composition is represented by the compositional formula: $_xBaO\text{-}_yTiO_2\text{-}_zNd_2O_3\text{-}_tSm_2O_3\text{-}_wBi_2O_3$ having the following compositional ranges when expressed in molar fractions.

$0.06 \leq x \leq 0.25$ $0.60 \leq y \leq 0.80$ $0.05 \leq z \leq 0.18$ $0 < t \leq 0.07$ $0 < w \leq 0.05$, provided that;

$x+y+z+t+w=1$ and a compositional range of $y<0.68$ and $z>0.15$ is excluded, that is, when y is less than 0.68, z cannot be greater than 0.15, and alternatively, when z is greater than 0.15, y cannot be less than 0.68.

According to a preferred embodiment of the present invention, the dielectric ceramic composition is represented by the compositional formula: $_xBaO\text{-}_yTiO_2\text{-}_zNd_2O_3\text{-}_tSm_2O_3\text{-}_wBi_2O_3$ having the following compositional ranges when expressed in molar fractions.

$0.10 \leq x \leq 0.20$ $0.65 \leq y \leq 0.75$ $0.10 \leq z \leq 0.15$ $0.01 \leq t \leq 0.055$ $0.001 \leq w \leq 0.04$, provided that;

$x+y+z+t+w=1$, and a compositional range of $y<0.68$ and $z>0.15$ is excluded.

In both the above embodiments, part of Ba may be replaced with at least one of Sr, Ca and Mg in a given molar fraction. The present dielectric ceramic composition may further be incorporated with at least one of $Al_2O_3$, $Fe_2O_3$, $SnO_2$, $ZnO$, $NiO$, $MnO$, $CuO$, $CoO$, $SiO_2$ and $ZrO_2$ in a given amount.

DESCRIPTION OF THE PREFERRED EMBODIMENTS

Figure 1A:
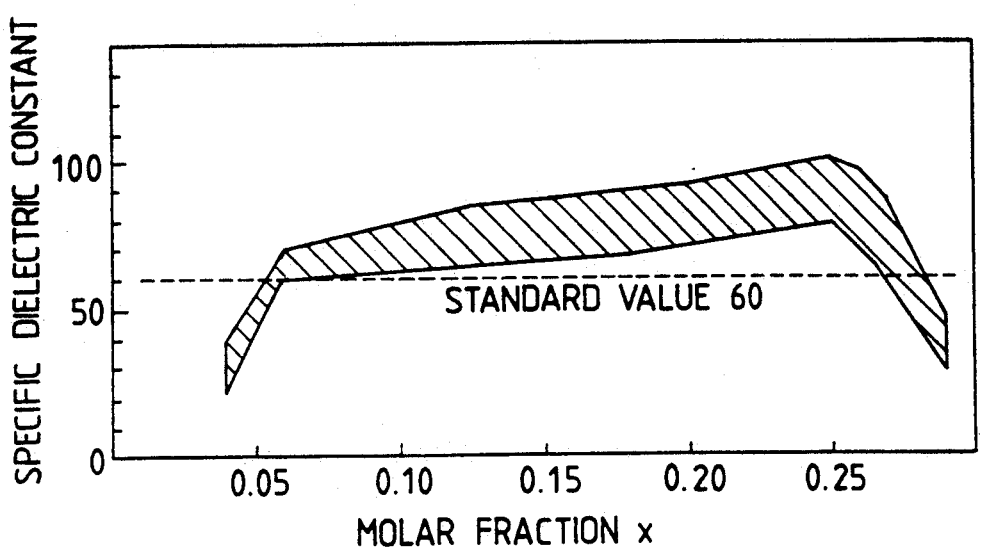
FIGS. 1A and 1B are graphs to show characteristics attributable to a main component of a dielectric ceramic composition according to an embodiment of the present invention.

The present invention will be described below in detail by giving examples.

As starting materials, $BaCO_3$, $TiO_2$, $Sm_2O_3$, $Nd_2O_3$ and $Bi_2O_3$ and optionally at least one of $Al_2O_3$, $Fe_2O_3$, $SnO_2$, $ZnO$, $NiO$, $Mno$, $CuO$, $CoO$, $SiO_2$ and $ZrO_2$ are used, which are materials industrially used. To prepare dielectric ceramic compositions, these materials were selected from those each having a purity of 99% or more. With regard to $Sm_2O_3$ and $Nd_2O_3$, materials each having a purity of 65, 70, 80, 90 or 99.9 wt. % were made ready for use.

The above starting material powders were weighed in given compositional proportions. Thereafter, the starting material powders and pure water were mixed under wet conditions in a proportion of starting material powders: pure water=1:2. This mixing under wet conditions was carried out using a urethane-lined ball mill equipped with agate media. The resulting mixtures were well dried so as to give a water content of 5% or less. In the present examples, the mixtures were dried at 150° C. to 200° C. for about 20 hours. The dried products were each molded into a pellet of 70 mm in diameters and 40 mm in thickness under a pressure of 400 k/gcm², and the molded product was calcined in the atmosphere at temperatures ranging from 900° to 1,000° C. Thereafter, the calcined product and pure water were put in a ball mill having the same structure as the above, in a proportion of a calcined product: pure water=1:2, and then mixed under wet conditions to carry out wet grinding. The ground product was dehydrated to dryness at 150° C. to 200° C. for about 20 hours so as to have a water content of 5% or less. Thereafter, to the resulting powdery product, a polyvinyl alcohol solution with a concentration of 3 w/v % was added as an organic binder to carry out granulation, followed by size classification using a 32 mesh sieve. The classified powder was molded into a pellet of 20 mm in diameter and 8 to 12 mm in thickness using a mold and a hydraulic press under a molding pressure of 800 kg/cm². The molded products thus obtained by repeating the above procedure were each fired at a temperature ranging from 1,200° to 1,550° C. for 2 to 3 hours, depending on their composition. The desired dielectric ceramics were thus obtained. The dielectric ceramic obtained were each used as a dielectric resonator and their unloaded Q and temperature coefficient of resonant frequency ($\tau f$) were measured. The dielectric constant was determined by calculation from resonant frequency and size of each dielectric ceramic. The resonant frequency was from 2 to 4 GHz. The temperature coefficient of resonant frequency ($\tau f$) was measured within the temperature range of from $-25°$ to 50° C. These characteristics were measured using a synthesized sweeper (Hp8340B), a network analyzer (HP8510B) and an S-parameter test set (HP8515B), manufactured by Hewlet Packard Inc.

EXAMPLE 1

Dependence of specific dielectric constant, unloaded Q or temperature coefficient of resonant frequency ($\tau f$) on the mixing proportion (molar fraction) of each component of the compositions was confirmed. Results obtained are shown in FIGS. 1A, 1B to FIGS. 4A, 4B.

Figure 1B:
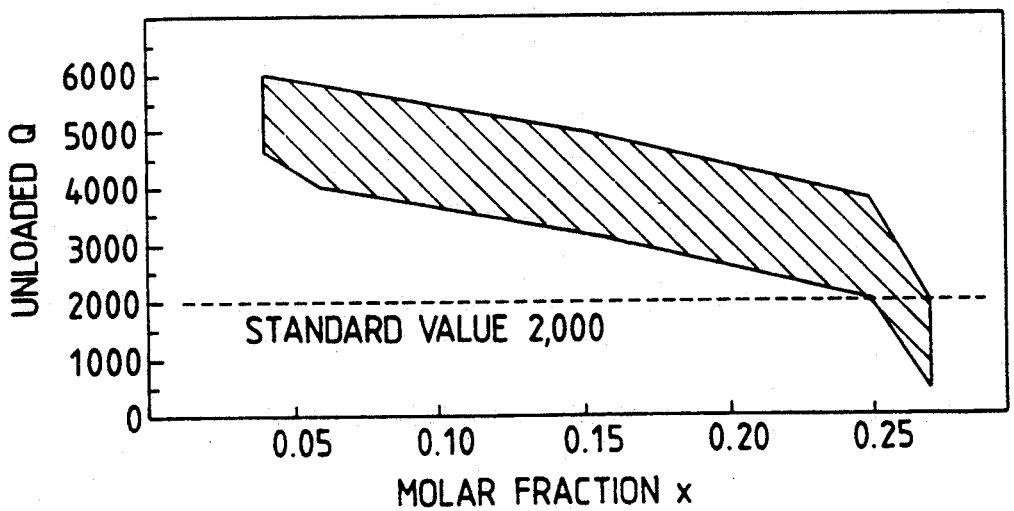
Figure 2A:
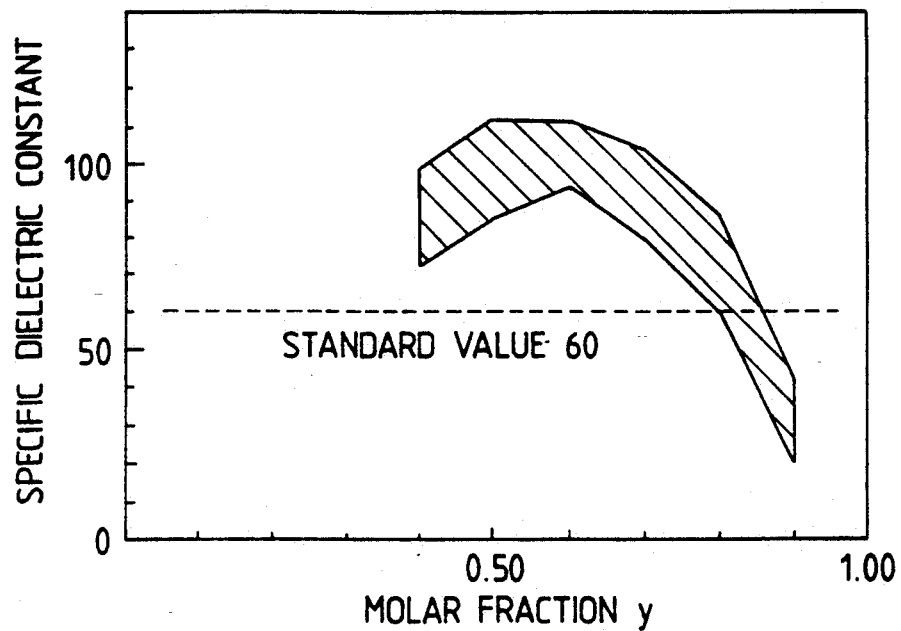
FIGS. 2A and 2B are graphs to show characteristics attributable to another main component of the dielectric ceramic composition.
Figure 2B:
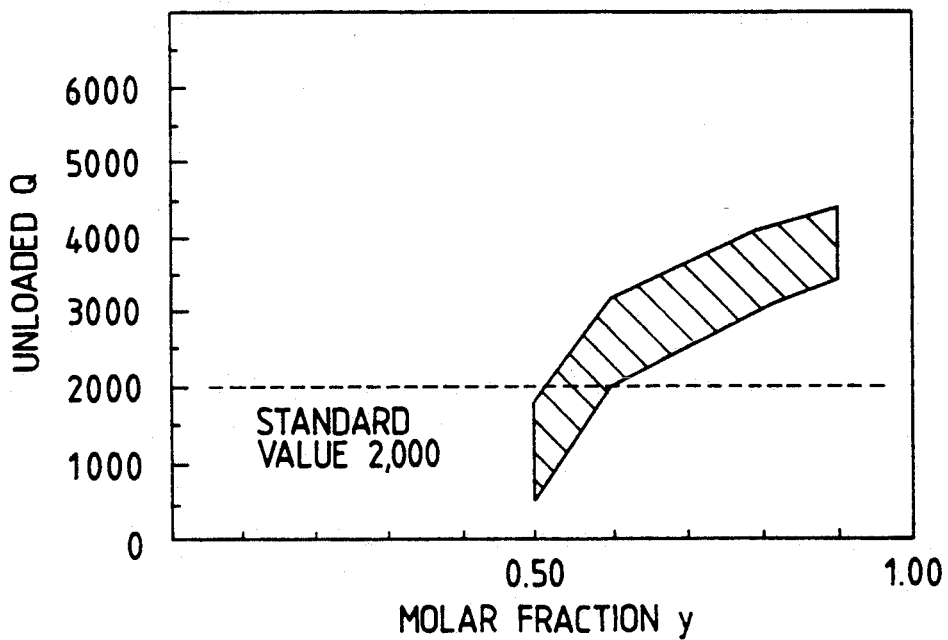
Figure 3A:
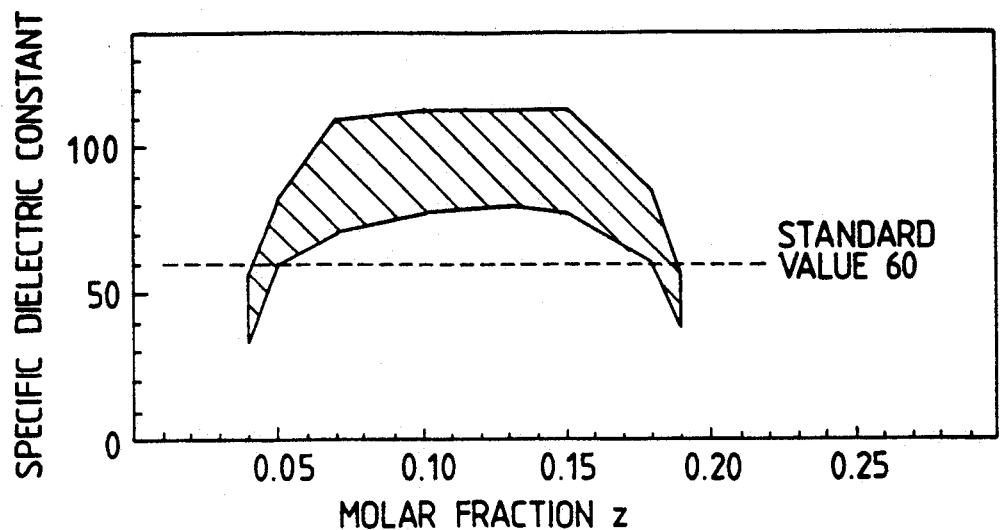
FIGS. 3A and 3B are graphs to show characteristics attributable to still another main component of the dielectric ceramic composition.
Figure 3B:
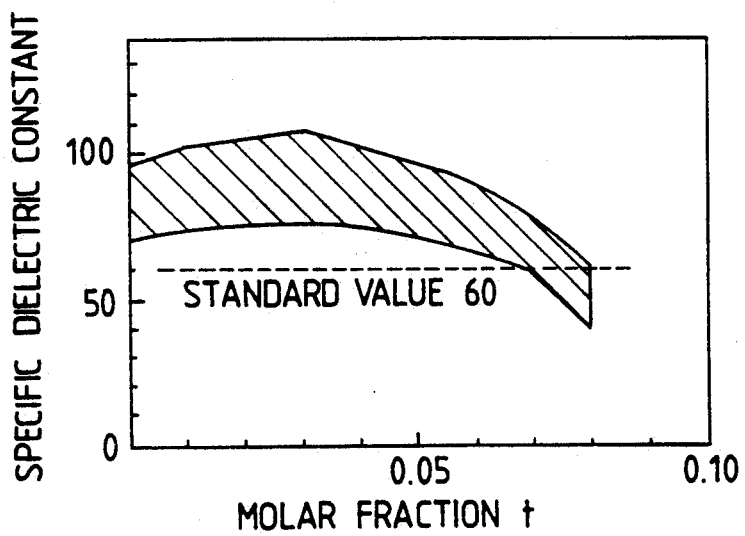

FIGS. 1A and 1B show the dependence of specific dielectric constant and unloaded Q, respectively, on the molar fraction (x) of BaO; FIGS. 2A and 2B, the dependence of specific dielectric constant and unloaded Q on the molar fraction (y) of $TiO_2$; FIG. 3A the dependence of specific dielectric constant on the molar fraction (z) of $Nd_2O_3$; FIG. 3B, the dependence of specific dielectric constant on the molar fraction (t) of $Sm_2O_3$; and FIGS. 4A and 4B, the dependence of unloaded Q and temperature coefficient of resonant frequency ($\tau f$), respectively, on the molar fraction (w) of $Bi_2O_3$.

In the above confirmation of the dependence on each molar fraction, the molar fractions of materials other than those of the materials the molar fractions of which were varied were kept constant within the range of the present invention.

The graphical representation was made by plotting characteristic values corresponding with the respective samples (the number of composition at the compositional points of a subject component: N=20) and regionally specifying the corresponding region on the graph. As is clear from FIGS. 1A to 4B, the dielectric ceramics comprised of the dielectric ceramic composition according to the present invention show a high specific dielectric constant and unloaded Q and a low temperature coefficient of resonant frequency ($\tau f$), in the frequencies of microwave regions. Judgement was made on the bases of unloaded $Q \geq 2,000$, specific dielectric constant $\geq 60$, and temperature coefficient of resonant frequency ($\tau f$)$\leq 100$ ppm/°C., as standard values. Such judgement was made for the following reasons: A dielectric ceramic composition with an unloaded Q less than 2,000 may cause an insertion loss to bring about a difficulty in the use of the composition in high-frequency filters, or that it may adversely affect the circuit because of heat generation or the like even when used as circuit substrates. With regard to the specific dielectric constant, unless it is 60 or more, it becomes necessary for the dielectric resonator to have a size of not smaller than 5 mm in a frequency region of from 1 to 2 GHz. A dielectric ceramic composition with a temperature coefficient of resonant frequency ($\tau f$) more than 100 ppm/°C. may cause a shift of resonant frequencies of a resonator formed on the circuit, depending on temperatures, making it impossible to ensure the matching on the circuit.

As is seen from FIG. 1A, when the BaO molar fraction x is less than 0.06, the specific dielectric constant becomes lower than its judgement standard value 60. As is also seen from FIG. 1B, when x is more than 0.25, the unloaded Q becomes lower than its judgement standard value 2,000. Thus, the molar fraction x should be not less than 0.06 and not more than 0.25. In particular, within that range, x is preferably not less than 0.10 and not more than 0.20.

As is also seen from FIG. 2A, when the $TiO_2$ molar fraction y is more than 0.80, the specific dielectric constant becomes lower than its judgement standard value 60. As is also seen from FIG. 2B, when y is more than 0.60, the unloaded Q becomes lower than its judgement standard value 2,000. Thus, the molar fraction y should be not less than 0.60 and not more than 0.80. In particular, within that range, y is preferably not less than 0.69 and not more than 0.65.

As is also seen from FIG. 3A, a dielectric ceramic composition with an $Nd_2O_3$ molar fraction z of not less than 0.05 and not more than 0.18 can bring about a higher specific dielectric constant than its judgement standard value 60. Thus, the molar fraction z should be not less than 0.05 and not more than 0.18. In particular, within that range, z is preferably not less than 0.10 and not more than 0.15.

As is also seen from FIG. 3B, when the $Sm_2O_3$ molar fraction t is more than 0.07, the specific dielectric constant becomes lower than its judgement standard value 60. Thus, the molar fraction t should be more than 0 and not more than 0.07. In particular, within that range, t is preferably not less than 0.01 and not more than 0.055.

Figure 4A:
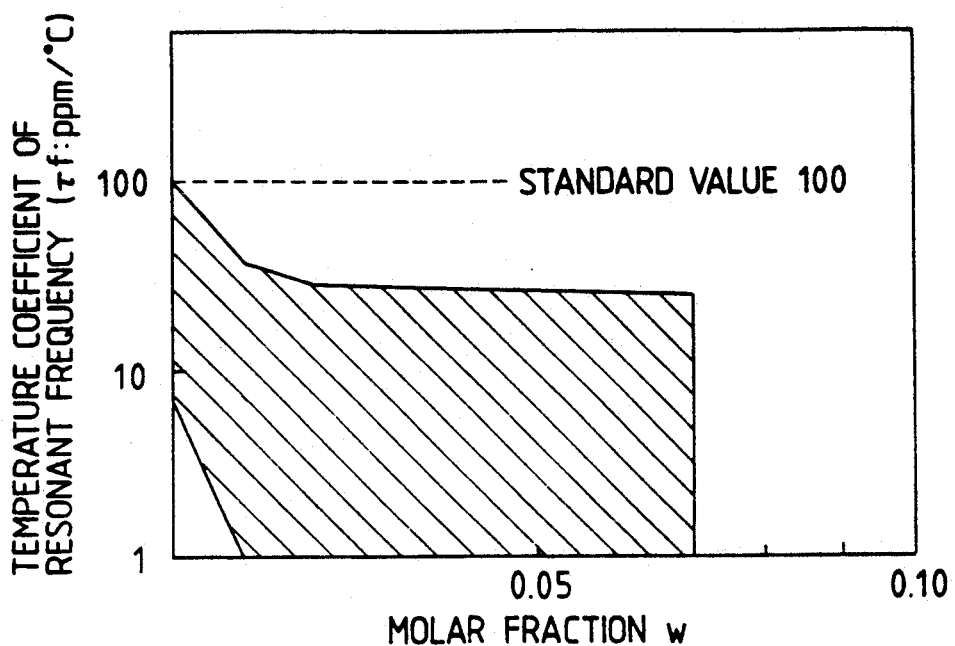
FIGS. 4A and 4B are graphs to show characteristics attributable to a further main component of the dielectric ceramic composition.
Figure 4B:
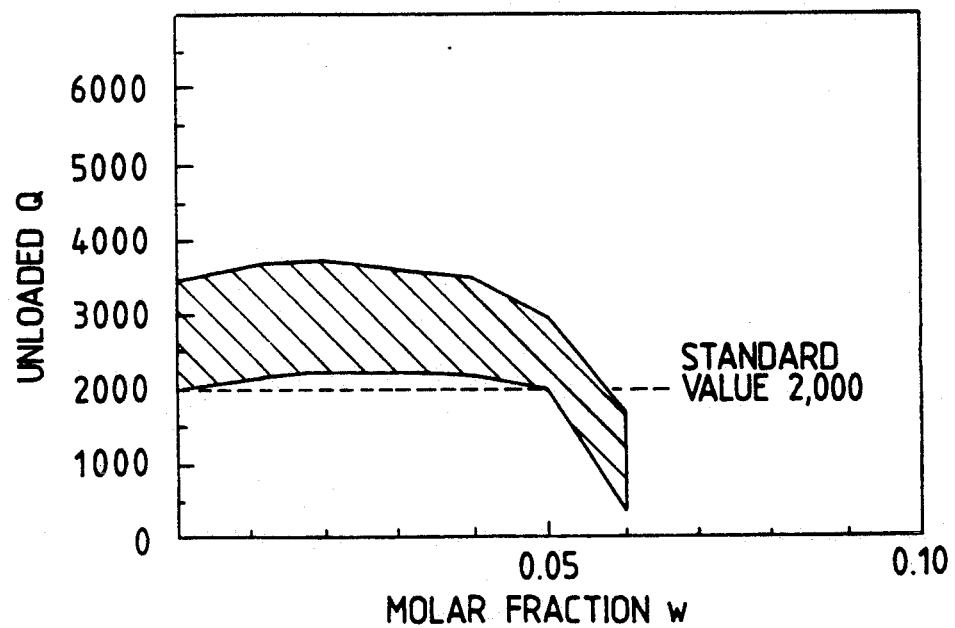

As is also seen from FIG. 4A, inclusion of $Bi_2O_3$ can bring about a lower temperature coefficient of resonant frequency ($\tau f$) than its judgement standard value 100, and, as is also seen from FIG. 4B, a dielectric ceramic composition with a molar fraction w of not more than 0.05 can bring about a higher unloaded Q than its judgement standard value 2,000. Thus, the molar fraction w should be more than 0 and not more than 0.05. In particular, within that range, w is preferably not less than 0.001 and not more than 0.04.

When, however, y<0.68 and z>0.15, the firing temperature must be made higher and $Bi_2O_3$ may be so rapidly evaporated during firing that no dense ceramic product can be obtained to give no intended effect of the present invention. Hence a compositional range of y<0.68 and z>0.15 is excluded.

EXAMPLE 2

To a dielectric ceramic composition represented by the compositional formula: $_xBaO-_yTiO_2-_zNd_2O_3-_tSm_2O_3-_wBi_2O_3$ so composed as to be in the molar fractions of x=0.122, y=0.69, z=0.141, t=0.052 and w=0.005, $Al_2O_3$ and $ZrO_2$ were added in given amounts, and the effect of their addition was confirmed. Results obtained are shown in FIGS. 5A, 5B and 6.

Figure 5A:
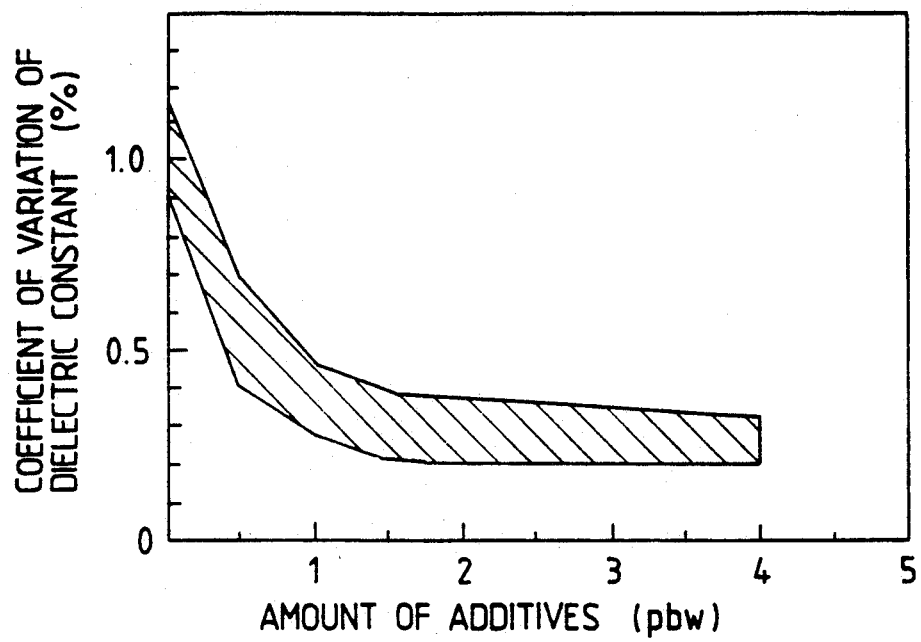
FIGS. 5A and 5B are graphs to show the effect of addition of a secondary component to the dielectric ceramic composition.
Figure 5B:
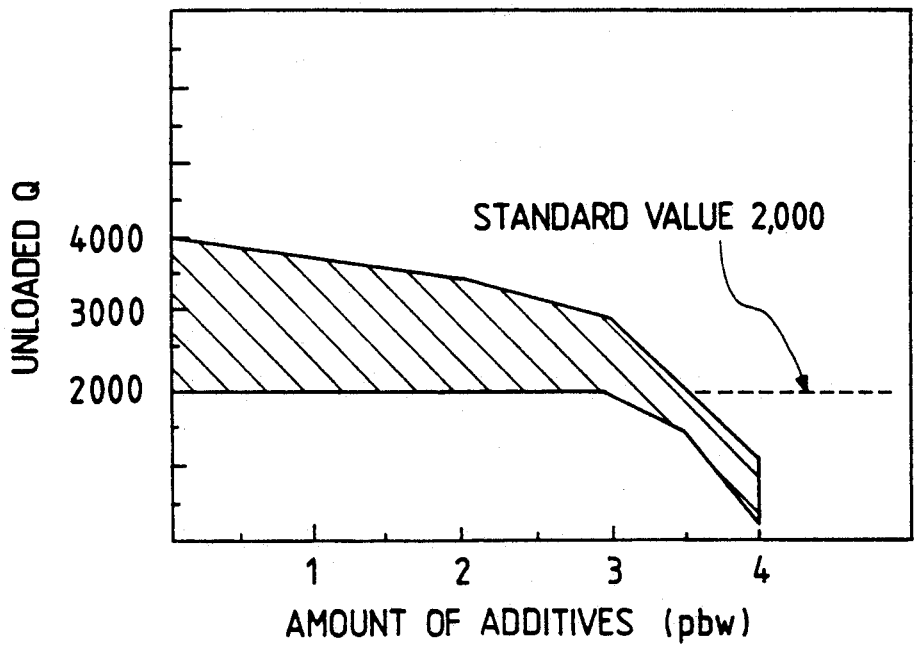
Figure 6:
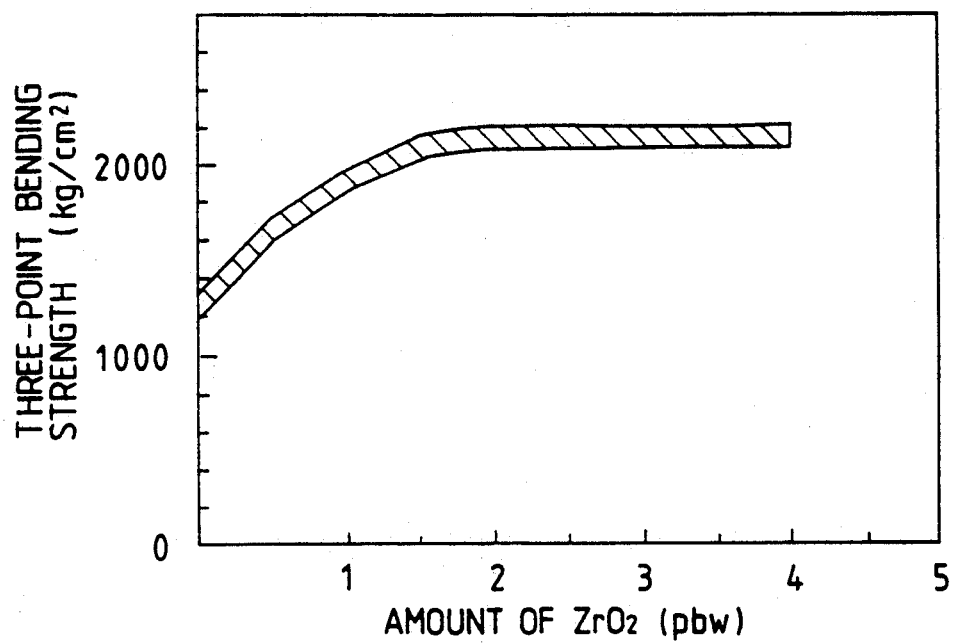
FIG. 6 is also a graph to show the effect of addition of the secondary component.

FIGS. 5A and 5B show the dependence of coefficient of variations of specific dielectric constant and that of unloaded Q, respectively, on the amount (parts by weight) in which they are added. The coefficient of variations of specific dielectric constant was determined by measuring the specific dielectric constant using the measuring system previously described and then calculating the rate of its changes. FIG. 6 shows the dependence of three-point bending strength ($kg/cm^2$) on the amount (parts by weight) in which $ZrO_2$ is added. The three-point bending strength was measured using a repulsion force resistance tester.

As is clear from FIGS. 5A and 5B, a decrease is seen in the dielectric constant, which can be considered due to an effect influenced by an improvement in sinterability. Their addition in an amount more than 3 parts by weight causes a decrease in unloaded Q, which can be considered due to an increase in glass layers produced in the vicinity of crystal grain boundaries. In particular, as is clear from FIG. 6, the addition of $ZrO_2$ brings about a remarkable increase in mechanical strength. However, its addition in an amount more than 3 parts by weight tends to bring about a lowering of unloaded Q as shown in FIG. 5B. In the meantime, it was also confirmed that there is not so much influence from differences in mixing ratios of $Al_2O_3$ and $ZrO_2$. Experiments were also carried out under conditions where the compositional molar fractions of the above composition were varied within the scope of the present invention. As a result, the same effect was obtained.

EXAMPLE 3

Using samples having the same composition as those used in Example 2 except that the element Ba was replaced with Sr, Ca and Mg in given proportions, the dependence of their specific dielectric constant and unloaded Q on the replacement of these were confirmed.

Figure 7A:
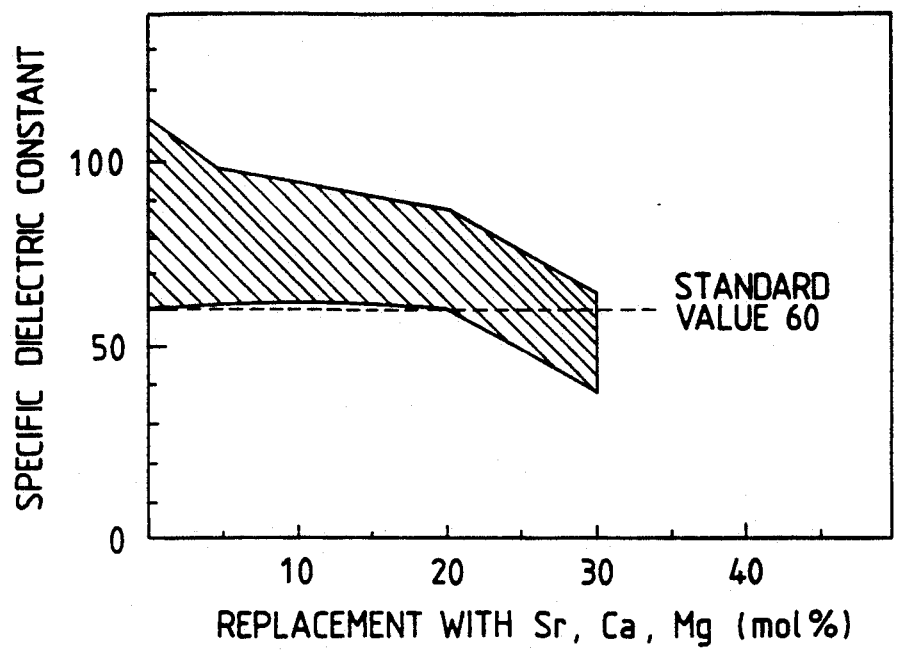
FIGS. 7A and 7B are graphs to show changes in characteristics when element Ba has been replaced with elements Sr, Ca and Mg.
Figure 7B:
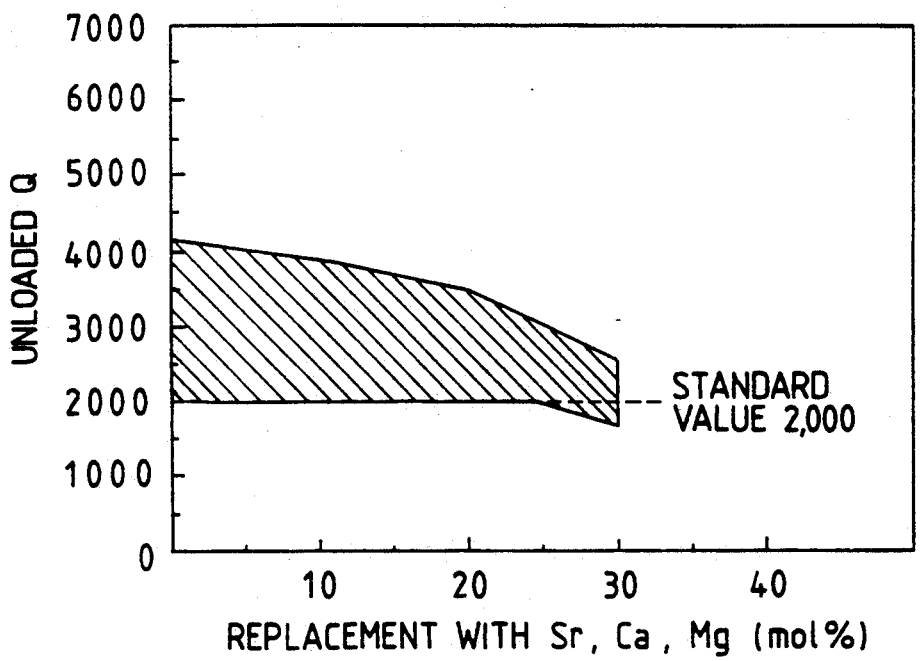

Results obtained are shown in FIGS. 7A and 7B. As is clearly seen from FIGS. 7A and 7B, the replacement of Sr, Ca and Mg in a rate more than 20 mol % tends to cause a lowering of specific dielectric constant and unloaded Q in part. It was also confirmed that the same results were obtained also when Sr, Ca and Mg were each used alone or used in any combination.

EXAMPLE 4

Using samples having the same composition as those used in Example 2, the influences of the purity of $Sm_2O_3$ and that of $Nd_2O_3$ on the specific dielectric constant were confirmed. Results obtained are shown in FIGS. 8A and 8B.

Figure 8A:
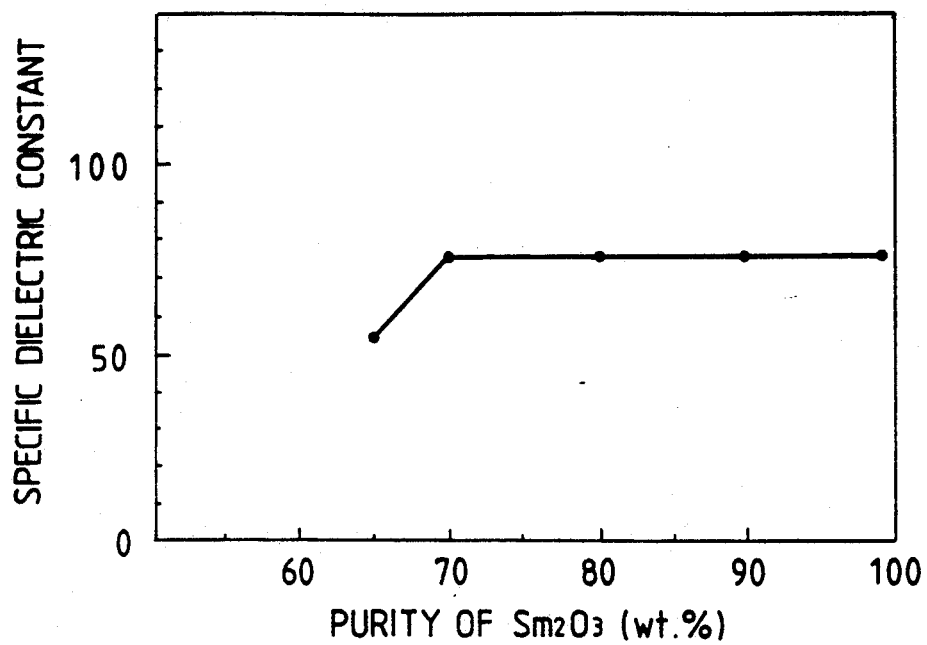
FIGS. 8A and 8B are graphs to show characteristics attributable to $Sm_2O_3$ and $Nd_2O_3$, respectively.
Figure 8B:
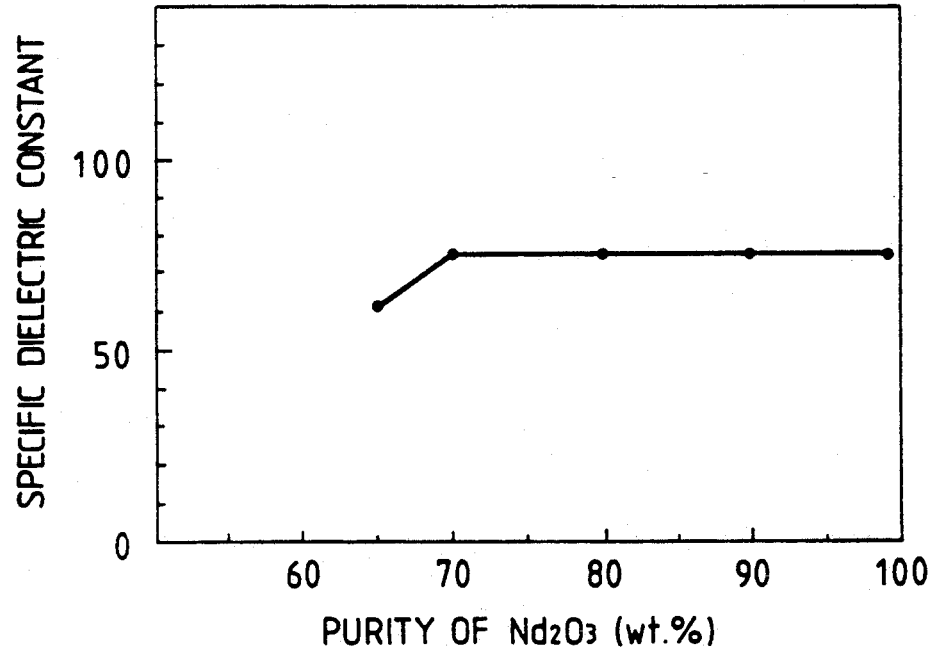

FIG. 8A shows the influence of the purity (wt. %) of $Sm_2O_3$, and FIG. 8B shows the influence of the purity (wt. %) of $Nd_2O_3$.

As is clearly seen from FIGS. 8A and 8B, use of $Sm_2O_3$ or $Nd_2O_3$ with a purity less than 70 wt. % only tends to cause a lowering of specific dielectric constant. Thus, it can be said that any materials industrially rectified can be satisfactorily used.

EXAMPLE 5

Dielectric ceramic compositions wherein the molar fractions of the compositional formula: $_xBaO-_yTiO_2-_zNd_2O_3-_tSm_2O_3-_wBi_2O_3$ were varied within the range of:

$0.06 \leq x \leq 0.25$ $0.60 \leq y \leq 0.80$ $0.05 \leq z \leq 0.18$ $0 < t23\ 0.07$ $0 < w \leq 0.05,$ provided that;

$x+y+z+t+w=1,$ and a compositional range of y<0.68 and z<0.15 is excluded, and compositions prepared in compositional ratios according to the prior art were tested to confirm the relationship between specific dielectric constant and unloaded Q or temperature coefficient of resonant frequency ($\tau f$). Results obtained are shown in FIGS. 9A and 9B.

Figure 9A:
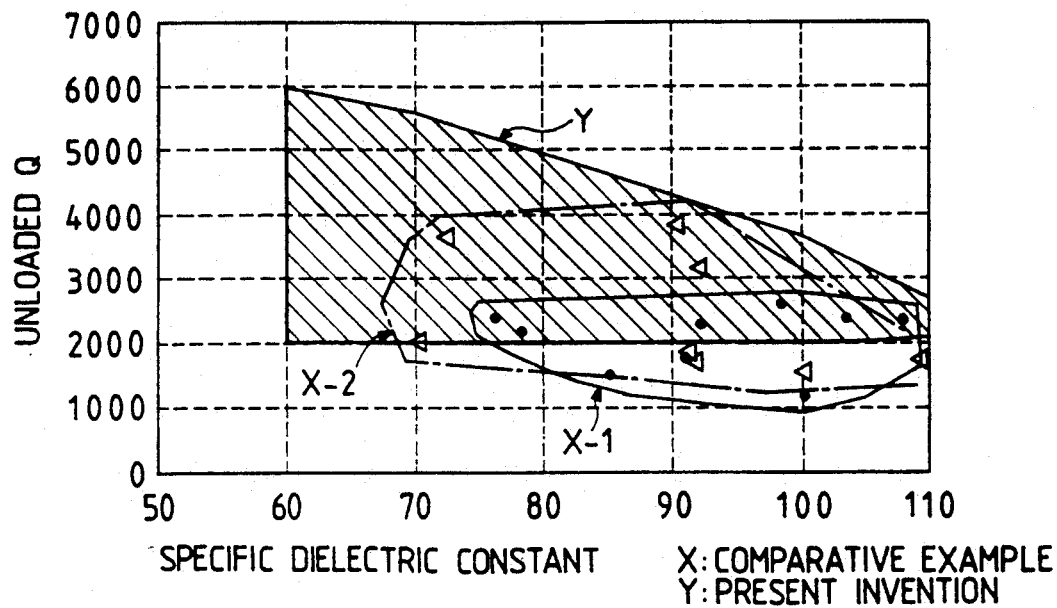
FIGS. 9A and 9B are graphs to show comparisons of characteristics of the compositions of the present invention and the prior art.
Figure 9B:
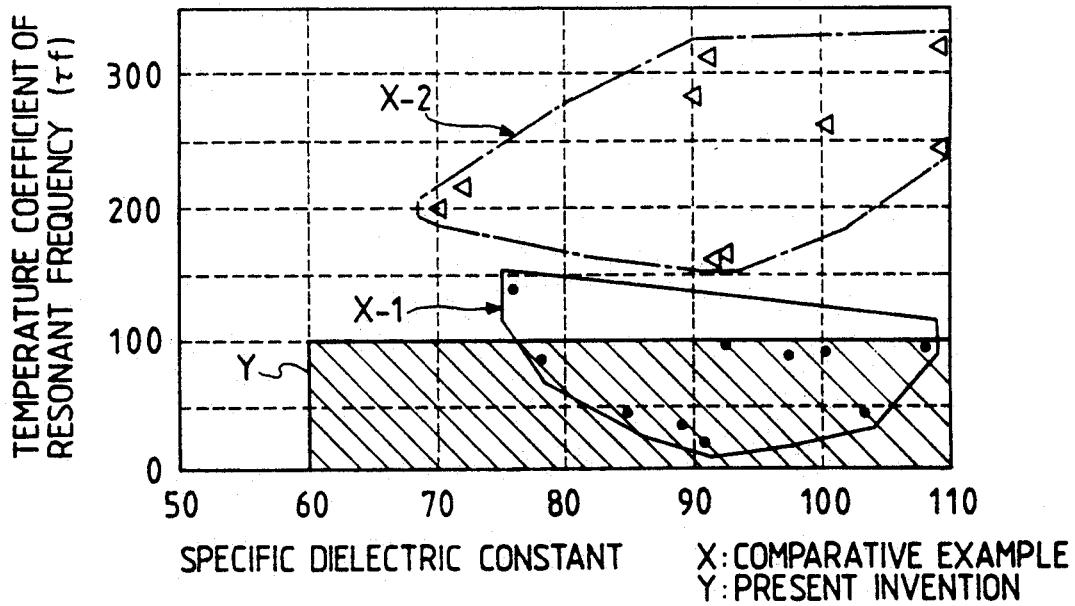

FIG. 9A shows the relationship between specific dielectric constant and unloaded Q of each dielectric ceramic composition, and FIG. 9B, the relationship between specific dielectric constant and temperature coefficient of resonant frequency ($\tau f$) of the same.

As Comparative Example 1, a dielectric ceramic composition disclosed in Japanese Patent Publication No. 59-59091 was used which was comprised of a ceramic composition comprising titanium oxide, barium oxide, neodium oxide and bismuth oxide, represented by the compositional formula: $_wTiO_2$-$_xNdO_{3+2}$-$_yBaO_{3+2}$ having the following compositional ranges.

$61.5 \leq w \leq 75$ $19 \leq x \leq 30$ $2 \leq y \leq 15$ $0.5 \leq z \leq 3.2$, and $x+y+z+w=100$ As Comparative Example 2, a dielectric ceramic composition disclosed in Japanese Patent Publication No. 60-41633 was used which was comprised of a ceramic composition comprising titanium oxide, barium oxide and neodium oxide, represented by the compositional formula: $_xTiO_2$-$_yNdO_3/_{2-z}BaO$ having the following compositional ranges.

$75 \leq w \leq 90$ $5 \leq x \leq 22$ $2 \leq y \leq 10$, and $x+y+z=100$

As is seen from FIGS. 9A and 9B, compared with Comparative Examples 1 and 2 (X-1, X-2), the present invention can achieve a higher unloaded Q and a lower temperature coefficient of resonant frequency ($\tau f$) with respect to the specific dielectric constant.

As described above, use of the composition BaO-$TiO_2$-$Nd_2O_3$-$Sm_2O_3$-$Bi_2O_3$ makes it possible to obtain a dielectric ceramic having a high dielectric constant and unloaded Q and a low temperature coefficient of resonant frequency ($\tau f$), in the frequencies of microwave regions. Addition of $Al_2O_3$ and/or $ZrO_2$ to the above composition also makes it possible to improve sinterability and at the same time control the scattering of dielectric constant to a low level. In particular, the $ZrO_2$ is contributory to a great improvement in the mechanical strength of the dielectric ceramic. In addition, the dielectric ceramic can have the same characteristics attributable to Ba also when Ba has been partly replaced with Sr, Ca and/or Mg, making it possible to respond the trend of materials being made greater in variety. Moreover, the $Sm_2O_3$ and $Nd_2O_3$, even when they are of low purity, can give characteristics close to the characteristics obtained when those of high purity are used, and thus can provide a superior dielectric ceramic composition.

Furthermore, even when impurities are included more or less, the dielectric ceramic composition of the present invention can obtain substantially the same effect.

What is claimed is:

1. A dielectric ceramic composition represented by the compositional formula: $_xBaO$-$_yTiO_2$-$_zNd_2O_3$-$_tSm_2O_3$-$_wBi_2O_3$ having the following compositional ranges when expressed in molar fractions:

$0.06 \leq x \leq 0.25$ $0.60 \leq Y \leq 0.80$ $0.05 \leq z \leq 0.18$ $0 < t \leq 0.07$ $0 < w \leq 0.05$, provided that;

$x+y+z+t+w=1$, and wherein when y is less than 0.68, z can not be greater than 0.15 and when z is greater than 0.15, y can not be less than 0.68, said dielectric ceramic composition exhibiting an unloaded Q valve greater than 2000 and a temperature coefficient of resonant frequency less than 100 $\tau f$.

2. A dielectric ceramic composition according to claim 1, wherein part of Ba is replaced with at least one of Sr, Ca and Mg in a molar fraction of not more than 20 mol %.

3. A dielectric ceramic composition according to claim 1, wherein said $Sm_2O_3$ and $Nd_2O_3$ each have a purity of at least 70 wt. % and a chemical component for its impurity comprises other rare earth element.

4. A dielectric ceramic composition according to claim 1, further comprising at least one of $Al_2O_3$, $Fe_2O_3$, $SnO_2$, $ZnO$, $NiO$, $MnO$, $CuO$, $CoO$, $SiO_2$ and $ZrO_2$ in an amount of not more than 3 parts by weight based on 100 parts by weight of said dielectric ceramic composition.

5. A dielectric ceramic composition according to claim 4, wherein part of Ba is replaced with at least one of Sr, Ca and Mg in a molar fraction of not more than 20 mol %.

6. A dielectric ceramic composition according to claim 4, wherein said $Sm_2O_3$ and $Nd_2O_3$ each have a purity of at least 70 wt. % and a chemical component for its impurity comprises other rare earth element.

7. A dielectric ceramic composition represented by the compositional formula: $_xBaO$-$_yTiO_2$-$_zNd_2O_3$-$_tSm_2O_3$-$_wBi_2O_3$ having the following compositional ranges when expressed in molar fractions:

$0.10 \leq x \leq 0.20$ $0.65 \leq y \leq 0.75$ $0.10 \leq z \leq 0.15$ $0.01 < t \leq 0.055$ $0.001 < w \leq 0.04$, provided that;

$x+y+z+t+w=1$, and wherein when y is less than 0.68, z can not be greater than 0.15 and when 2 is greater than 0.15, y can not be less than 0.68, said dielectric ceramic composition exhibiting an unloaded Q valve greater than 2000 and a temperature coefficient of resonant frequency less than 100 $\tau f$.

8. A dielectric ceramic composition according to claim 7, wherein part of Ba is replaced with at least one of Sr, Ca and Mg in a molar fraction of not more than 20 mol %.

9. A dielectric ceramic composition according to claim 7, wherein said $Sm_2O_3$ and $Nd_2O_3$ each have a purity of at least 70 wt. % and a chemical component for its impurity comprises other rare earth element.

10. A dielectric ceramic composition according to claim 7, further comprising at least one of $Al_2O_3$, $Fe_2O_3$, $SnO_2$, $ZnO$, $NiO$, $MnO$, $CuO$, $CoO$, $SiO_2$ and $ZrO_2$ in an amount of not more than 3 parts by weight based on 100 parts by weight of said dielectric ceramic composition.

11. A dielectric ceramic composition according to claim 10, wherein part of Ba is replaced with at least one of Sr, Ca and Mg in a molar fraction of not more than 20 mol %.

12. A dielectric ceramic composition according to claim 10, wherein said $Sm_2O_3$ and $Nd_2O_3$ each have a purity of at least 70 wt. % and a chemical component for its impurity comprises other rare earth element.

* * * * *